Nov. 16, 1965   W. ROTH ETAL   3,217,419
COMPUTER GAGE
Filed Feb. 1, 1962   3 Sheets-Sheet 1
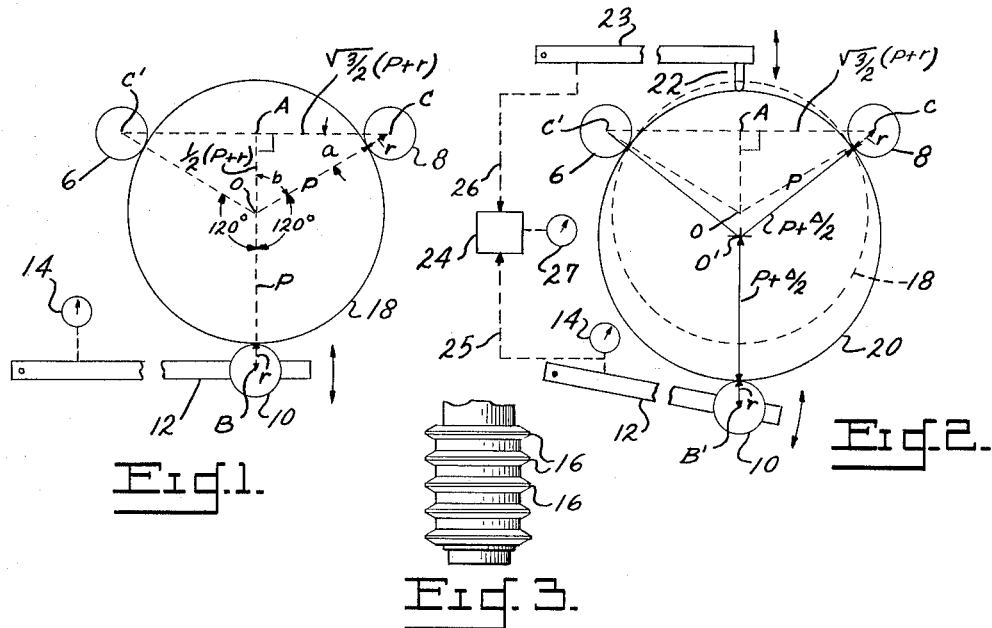
Fig.1.   Fig.2.
Fig.3.
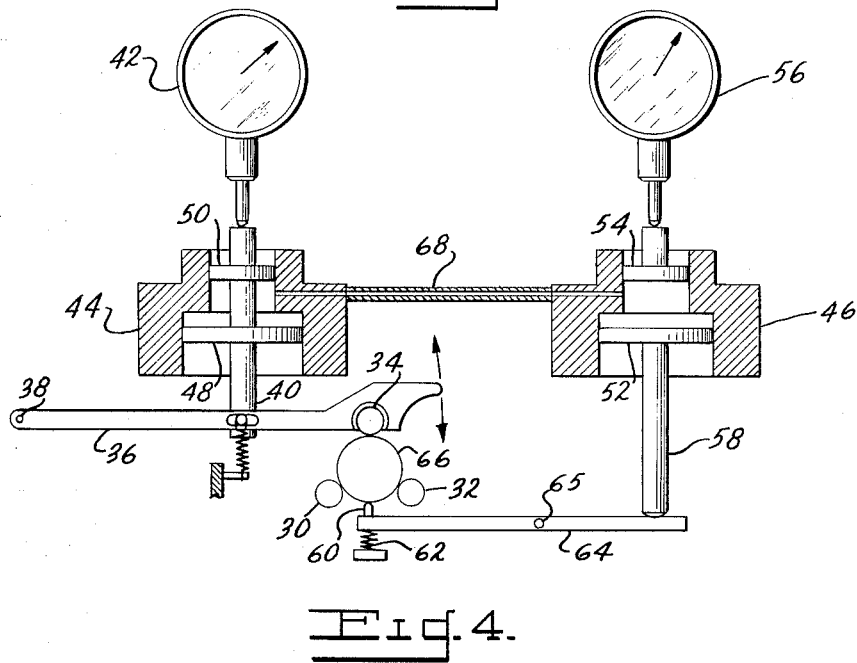
Fig.4.
INVENTORS
Wilfred Roth
Paul D. Henderson
BY Chapin & Neal
Attorneys

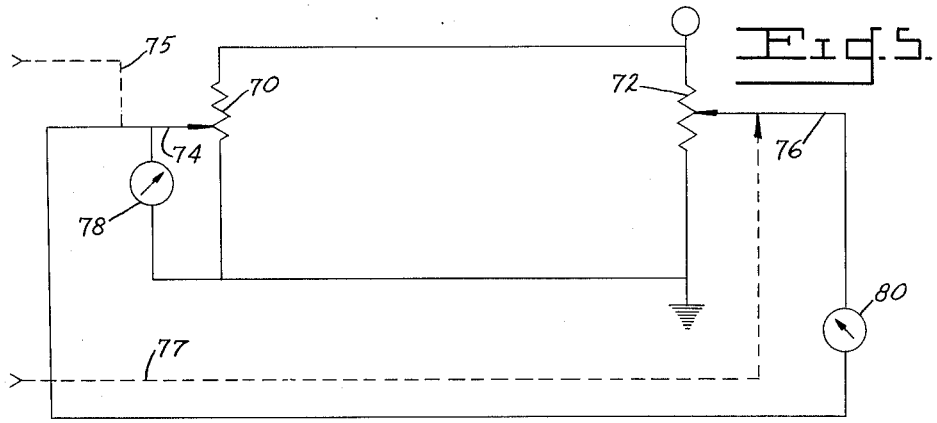
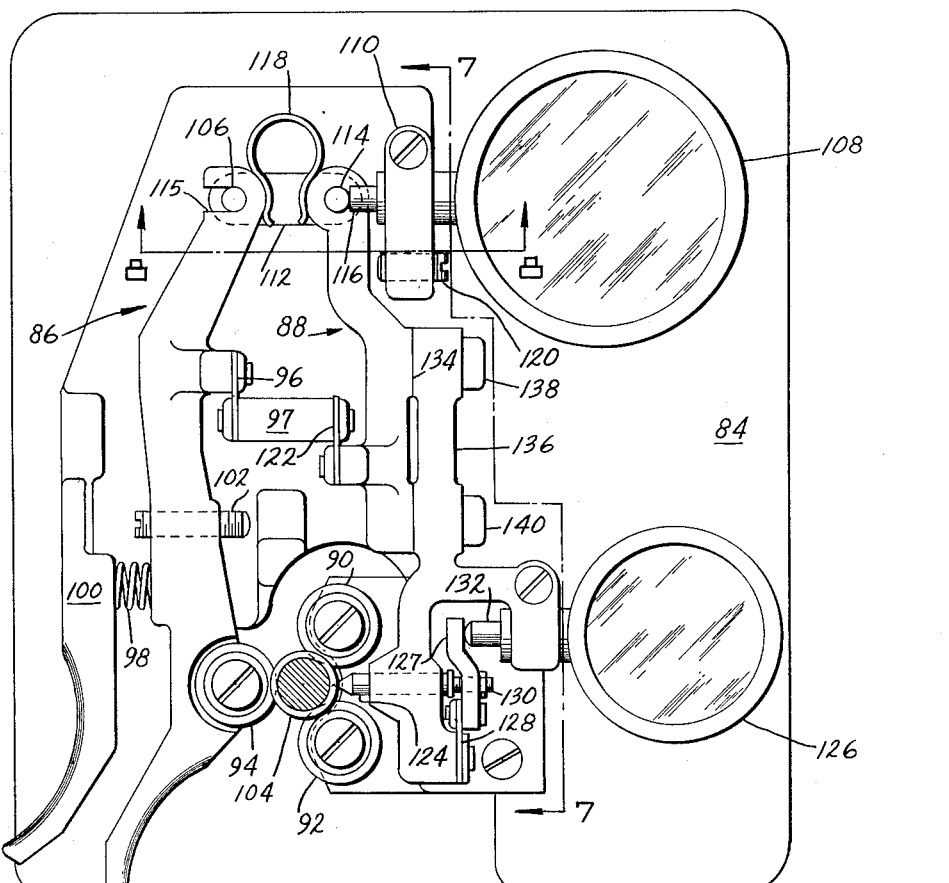

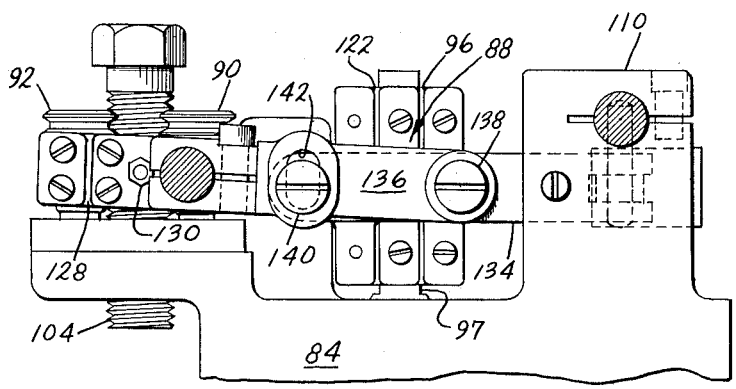
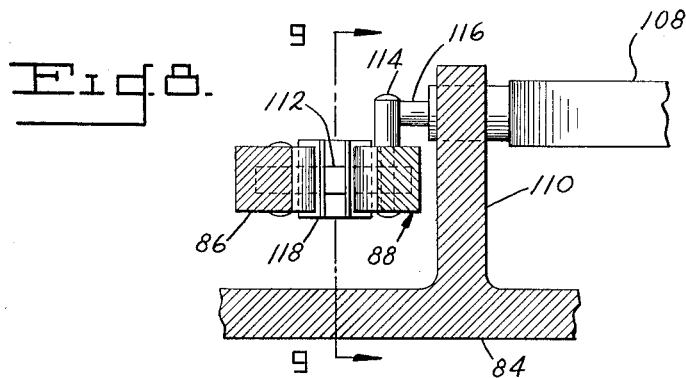
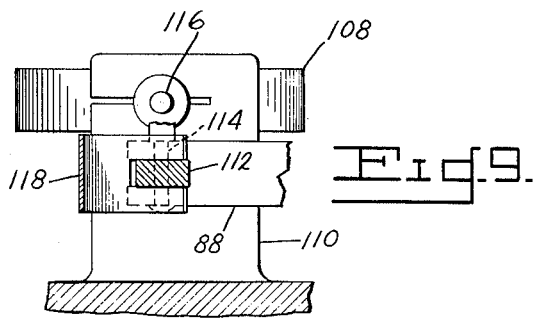

United States Patent Office 3,217,419
Patented Nov. 16, 1965

3,217,419
COMPUTER GAGE
Wilfred Roth, West Hartford, and Paul D. Henderson, Avon, Conn., assignors to United-Greenfield Corporation, Chicago, Ill., a corporation of Delaware
Filed Feb. 1, 1962, Ser. No. 170,343
5 Claims. (Cl. 33—199)

This invention relates to method and apparatus for gaging threaded product and particularly to indicating gages of various types.

There are two general methods of approach in gaging threaded product; one is known as gaging by attributes, and the other gaging by variables. Gaging by attributes assures that the product is within prescribed limits of size; while gaging by variables measures the extent of deviation of a threaded product from prescribed limits of size.

One type of indicating gage now in wide use includes a plurality of contact elements which are designed to provide information as to the virtual or effective size of a threaded product. Another type of indicating gage includes contact elements adapted to gage severally the effect of deviations in individual thread elements, such as errors in lead, pitch errors and uniformity of helix, and flank angle. In the manufacture of threaded product to meet rigid performance standards, two gage inspections are often required. One is a maximum material check known as "Go" gaging which gages the virtual diameter or effective size of the product. Virtual diameter indicates the overall assemblability of the product with its mating component, and as mentioned above, includes the cumulative or total effect of errors in individual thread elements. The purpose of the other inspection check is to individual thread elements and is generally known as "Not Go" or "Lo" gaging for an externally threaded product and "Not Go" or "Hi" gaging for internally threaded product. For example, the "Not Go" check may constitute a measurement as nearly as practicable of the actual pitch diameter of a thread.

Conventionally, in order to gage for the cumulative and several effects of deviation in screw thread elements, two indicating gages and two separate gaging operations are required. It will be realized that this procedure is costly and time-consuming and requires excessive manipulation of the product.

It is the principal object of this invention to provide improved gaging methods by which both the virtual or effective diameter and at least one individual element of the thread form are checked simultaneously with the requisite degree of accuracy.

It is another object of this invention to provide an indicator gage which performs both maximum and minimum metal checks simultaneously. In accordance with this invention a multiple purpose gage is provided which is capable of carrying out the same gaging operations formerly requiring the use of two or more separate gages.

The above and other objects and advantages of this invention will be more readily apparent in the following description and with reference to the accompanying drawing in which:

FIG. 1 is a diagrammatical view showing the mathematical relationship of a tri-roll indicator gage;

FIG. 2 is a view similar to FIG. 1 showing the gage in operation;

FIG. 3 is a side view of one type of gage roll which may be used in gages embodying this invention;

FIG. 4 is a diagrammatical view of an hydraulic type computing gage embodying the invention;

FIG. 5 is a diagrammatical view showing an electrical computing circuit for carrying out the invention;

FIG. 6 is a plan view of a mechanical computing gage embodying this invention;

FIG. 7 is a section taken along line 7—7 of FIG. 6;

FIG. 8 is a section taken along line 8—8 of FIG. 6; and

FIG. 9 is a section taken along line 9—9 of FIG. 8.

Referring in detail to the drawing, an indicating gage is shown diagrammatically in FIG. 1. The gage includes a pair of stationary rolls 6 and 8, and a roll 10 carried by an arm 12 which is pivotable for movement toward and away from the stationary rolls. A dial 14 is provided which is responsive to the movement of the arm 12 for indicating size errors of the product being gaged.

As shown, the rolls 6, 8 and 10 are positioned with their axes in spaced parallel relation equally radially spaced from a central axis O. Each of the rolls includes a plurality of thread engaging elements 16, such as shown in FIG. 3. The elements 16 are in the form of annular ribs extending radially outwardly of the surface of the roll. The ribs are provided over a predetermined longitudinal portion of the roll sufficient to span a suitable length of product thread. A gage of this type is conventionally used to measure the virtual or effective diameter of threaded product.

Product gaging is carried out by first zeroing the indicator 14 by positioning a minimum material setting gage, indicated at 18 in FIG. 1. Any deviation in the effective size of threaded product, such as represented at 20 in FIG. 2, from the size of the setting gage, will cause the roll 10 to be moved toward or away from the stationary rolls. The amount of movement of the rolls 10 may be indicated by any suitable means such as the dial 14, or may be used to generate a signal to automatically control the product size.

In accordance with this invention, a way has been found for gaging an individual element of a thread form at the same time as its overall effective size is gaged. Since the rolls 6 and 8 are fixed, line CC' from center to center of the fixed rolls is used as a reference or datum line for computing the extent of the movement of the movable roll as a mathematical function of product size deviation. With the setting plus 18 in place, as shown in FIG. 1, the gage rolls are disposed circumferentially of the plug 18, 120° apart. If there is any deviation in the threaded product 20 as compared to the setting plug 18, the movable roll 10 will be moved toward or away from fixed rolls. The effect of this deviation is that the centerline or axis of the thread is displaced from the reference axis O established by the setting plug. It has been found that this axis displacement or shift is exactly equal to the deviation in the effective diameter of the product. Moreover, the axis shift takes place along a line AB which represents a plane perpendicularly bisecting the datum line CC'. The extent of movement of the roll 10 is equal to 3/2 change in the effective diameter. Of course, it will be realized the positioning of the gage rolls may be other than 120° with appropriate changes in the proportions and computations herein described. For the roll positioning shown the relationships were determined by the following mathematical relationships:

Let:

$D=2p=$pitch diameter of setting plug,
$d=2r=$diameter of measuring rolls,
$\Delta=\delta LA+\delta p=$total error of thread form of product being gaged, Where:

$\delta LA=$thread lead+angle errors,
$\delta p=$pitch diameter error

Referring now to FIG. 1, the distance $AB=AO+p+r$. Since the gage rolls are located 120° apart $\angle a=30°$ and $\angle b=60°$. Thus side $AC=\sqrt{3}/2(p+r)$ and $$AO=\frac{1}{2}(p+r)$$

Distance $AB = \frac{1}{2}(p+r) + p + r$ $$AB = \frac{1}{2}\left(\frac{D}{2} + \frac{d}{2}\right) + \frac{D}{2} + \frac{d}{2}$$

$$AB = \frac{D}{4} + \frac{d}{4} + \frac{D}{2} + \frac{d}{2}$$

Thus:

$$AB = \frac{3}{4}(D+d)$$

The dial of indicator 14 is zeroed with a setting plug in place in the gage. Any product subsequently measured which deviates from the size of the setting plug will cause movement of the roll 10 toward or away from the datum line CC'. The extent of movement of roll 10 is so small, it may be considered as being perpendicular to the datum line.

In FIG. 2 is shown a threaded product 20 larger in effective diameter than the setting plug by an amount Δ.

$$AC = \sqrt{3}/2(p+r)$$

The hypotenuse $CO' = p + \Delta/2 + r$
Thus, using the right triangle relationship:

$$AO' = [(p + \Delta/2 + r)^2 - \frac{3}{4}(p+r)^2]^{\frac{1}{2}}$$

By binominal expansion $$AO' = \left[(p+r)^2\left(1 + \frac{\Delta}{2(p+r)}\right)^2 - \frac{3}{4}(p+r)^2\right]^{1/2}$$

$$AO' = (p+r)\left[1 + \frac{\Delta}{p+r} - \frac{3}{4}\right]^{1/2}$$

*Note.*—Terms in $\Delta^2$ and higher order have been dropped because Δ is so small contribution of these terms of higher order may be disregarded.

$$AO' = (p+r)\left(\frac{1}{4} + \frac{\Delta}{p+r}\right)^{1/2} = (p+r)(\frac{1}{4})^{1/2}\left(1 + \frac{4\Delta}{p+r}\right)^{1/2}$$

$$AO' = \left(\frac{p+r}{2}\right)\left(1 + \frac{4\Delta}{p+r}\right)^{1/2}$$

Since Δ is small, the square root can be taken using binomial expansion, again the $\Delta^2$ and higher order terms are dropped, and $$AO' = \left(\frac{p+r}{2}\right)\left(1 + \frac{1}{2}\frac{4\Delta}{p+r}\right)$$

$$AO' = \frac{p+r}{2} + \Delta = \frac{D+d}{4} + \Delta$$

$$AB' = AO' + O'B'$$

$$AB' = \frac{D+d}{4} + \Delta + \frac{D+\Delta}{2} + \frac{d}{2}$$

$$AB' = \frac{3}{4}(D+d) + \frac{3}{2}\Delta$$

$$AB' - AB = \frac{3}{2}\Delta$$

It will thus be seen that the movement of roll 10 is equal to 3/2Δ

In accordance with this invention it has been found that minimum material gaging of a threaded product can be accomplished simultaneously with the maximum material check indicated by dial 14 by providing gaging means sensitive to deviations in the individual thread element desired to be gaged such as pitch diameter, lead, angle, etc. The gaging means may be sensitive to the thread element alone or in combination with total size deviation. By way of illustration, in FIG. 2 is shown a probe 22 mounted on a pivotable arm 23. The probe has a configuration sensitive to or capable of detecting deviations in a single element of the thread form which in the example is pitch diameter. Since the pitch diameter of any product circular in cross section must be measured radially from its center and since, as described above, product deviation from standard causes a center shift or displacement from O to O', accurate sensing can only be accomplished in a plane containing the perpendicular bisector of the datum line CC'. Because of the center shift of a threaded product, movement of probe 22 equals the algebraic sum of this center shift and ½ any pitch diameter error. In accordance with this invention, a computer 24 is provided to compute pitch diameter. The computer receives an input 25 which is a function of the change in effective size of the product and an input 26 which is a function of the change in effective size plus or minus pitch diameter deviation. In the computer the input 25 is subtracted from the input 26 so that the computer output is equal to pitch diameter which may be indicated on dial 27.

Since:

$$AO - \frac{1}{2}(p+r) = \frac{1}{2}\left(\frac{D}{2} + \frac{d}{2}\right)$$

$$AO = \frac{D+d}{4} \text{ and } AO' = \frac{D+d}{4} + \Delta$$

$$AO' - AO = \Delta$$

This means that when a product is gaged, its diameter variation, as compared with the setting plug, causes the axis or centerline of the product to shift or be displaced along a line perpendicular to the datum line CC' a distance equal to the size variation.

Shown diagrammatically in FIG. 4 is one type of gage embodying this invention and is illustrative of means for utilizing the mathematical concepts developed above for enabling maximum and minimum metal gaging to be accomplished simultaneously. The gage shown comprises 3 rolls arranged as described above. Rolls 30 and 32 are stationary and roll 34 is carried on a lever arm 36. The lever arm is pivotable about a fulcrum 38 for movement toward and away from the stationary rolls. A rod 40 is positioned to be moved by the arm 36. The outer end of the rod 40 is engaged with the stem of an indicator dial 42 which is used to indicate deviations or errors of effective diameter. As shown, the rod 40 is located at a distance from the fulcrum 38 equal to ⅔ the distance from the fulcrum to the roll 34. Since, as described above, size deviations of a thread form are detached by movement of the roll 34 equal to 3/2 the error, location of the indicator actuating rod 40, as shown, eliminates the 3/2 fraction from the computations and the dial 42 may be directly calibrated to read total deviation of effective diameter.

The gage of FIG. 4 is provided with means for computing deviations of an individual element of the thread form, which, for illustrative purposes, is pitch diameter. As shown, the computer comprises cylinders 44 and 46 of different diameter. Carried on the actuating rod 40 are a pair of pistons 48 and 50. The area of piston 48 is 3 times as great as the area of piston 50; pistons 52 and 54 respectively of the same size ratio, are provided in the other cylinder. Movement of the piston 54 actuates an indicator, such as a dial 56, and is movable independently of piston 52. The piston 52 is mounted on a shaft or rod 58 movable axially in response to a pitch diameter probe 60, urged by a spring 62 into contact with the thread form of a threaded member.

The probe 60 is mounted on a lever 64 pivoted about a fulcrum 65. As shown, there is a 3-to-2 ratio of the distance from the probe to the fulcrum 65 to the distance from the fulcrum of the rod 58. This ratio is selected so that piston 52 moves an amount equal to pitch diameter error only. With shaft 40 held fixed, any movement of piston 52 acts upon the fluid in cylinder 46 and actuates piston 54 to cause indicator 56 to read actual pitch diameter deviations from setting plug.

In operation of the hydraulic computing gage, the dials are first zeroed by using a minimum material setting plug. For purposes of this explanation, it will be assumed that a threaded product, such as indicated at 66, has a total effective size deviation, as compared with the setting plug of .003. It will be further assumed that this total size deviation is composed of .002 pitch diameter deviation and .001 lead and angle deviation. With the product positioned between the gaging rolls, the dial 42 will read .003. This movement results from equal movement of the rod 40. Movement of the rod 40 will reduce the volumetric capacity of the cylinder 44 by an amount proportional to 2 times the total effective size deviation. The volumetric reduction may be presented as .006X, in which X represents a constant depending on actual piston dimensions. This reduction in the volume of cylinder 44 causes an equal amount of fluid to be transferred by conduit 68 to the cylinder 46. Since probe 60 is held in engagement with the threaded product 66, its movement from its zero position will be equal to center shift plus or minus ½ the pitch diameter deviation. Considering first only the center shift of .003, this will result in downward movement of the rod 58 an amount equal to .002. This results in an increase in the volume of cylinder 46 an amount equal to .006X, which is sufficient to accommodate the fluid transferred from the cylinder 44. Since the probe is also responsive to errors in pitch diameter, it will move downwardly .001, causing rod 58 to move upwardly .002/3. The volume of cylinder 46 will decrease $$\left(\frac{.002}{3}\right)X3X = .002X$$

Piston 54 will be caused to move .002 from its zero position, and dial 56 will register .002. It will thus be seen that both the effective size and pitch diameter of the thread have been gaged simultaneously.

In FIG. 5 is shown a circuit diagram of an electrical system embodying the invention. As shown, the circuit comprises a voltage divider network for computation of pitch diameter. The voltage divider includes a potentiometer 70 and another potentiometer 72. The wiper arm 74 of the first potentiometer is positioned in response to an input 75 from a movable gage roll, such as described above. The wiper arm 76 of the second potentiometer is movable in response to an input 77 from a pitch diameter sensing probe of the above described type. A source of electrical power which may be either A.C. or D.C. is connected across the potentiometer 72. A voltmeter 78 is connected to the wiper arm 74 and the grounded end of the potentiometer for maximum material gaging. Another voltmeter 80 for indicating pitch diameter is connected in series between the movable arms of the two potentiometers. The voltmeter 80 serves to compare the voltages developed in response to the positions of the two wiper arms so as to indicate the algebraic sum of deviation in effective diameter and pitch diameter errors.

In using the electrical computer gage, a setting plug would first be used to zero the indicators 78 and 80. A threaded product which deviates from standard size would produce a voltage at the wiper of the potentiometer 70 giving a maximum material reading on the voltmeter 78. If the product being measured has a deviation of pitch diameter, the difference between the maximum material input and minimum material input would be indicated on the voltmeter 80.

The voltmeter 80 is connected between the two potentiometer wipers and the meter has an electrical impedance which is substantially higher than the two potentiometers. Thus, the difference between the maximum material input and the minimum material input would be automatically indicated on the meter.

A mechanical gage embodying this invention is shown in FIGS. 6–9. The gage comprises a support member 84 on which are mounted a pair of pivotable arms 86 and 88 which are first-class levers. The gage also includes a pair of stationary gage rolls 90 and 92 and a gage roll 94 carried on the lever arm 86 for movement toward and away from the fixed rolls. The arm 86 is pivotable about a flexible spring metal hinge or reed 96. The reed 96 is supported by a block 97 which extends upwardly of the base 84 intermediate the arms 86 and 88. The gage rolls may be the same type as shown in FIG. 3, and are free for axial movement for correct interengagement with the threads of a workpiece.

A compression spring 98 urges the lever arm 86 toward the fixed gaging rolls 90 and 92. One end of the spring is fitted into a recess in the arm 86 and the other end in a recess on a fixed arm 100. The arm 86 is provided with a stop pin 102 to prevent the roll 94 coming into contact with the fixed rolls. Size deviation of the product results in movement of the movable roll 94 relative to the fixed roll which is proportional to three halves of the size deviation. Thus it is preferable that the distance from the center of the roll 94 to the hinge 96 be three halves that of the distance from the hinge to the center of pin 106. Thus the pin 106 moves a distance equal to deviations in the size of the product.

Movement of the lever 86 is transmitted to a maximum metal indicating dial 108 supported by a block 110 which extends from the base 84. The lever arm 88 is pivoted in response to pivotable movement of the lever 86 by means of an interconnecting link 112. The pin 106 is carried in one end of the link 112 and extends into slot 115 in the arm 86. A pin 114 interconnects the other end of link 112 and arm 88. The upper end of the pin 114 is disposed to engage stem 116 of the dial 108. A stiff spring 118 is fitted on the link 112 between levers 86 and 88 whereby outward movement of the roll 94 is transmitted to the dial 108 without compression of the spring. The spring provides a yieldable connection which enables the arm 86 to be swung away from the fixed gage rolls sufficiently to facilitate insertion and removal of the product between the rolls. This relatively large amount of movement of the arm 86 will move arm 88 into engagement with an adjustable stop screw 120, thereafter any further movement of the arm 86 will compress the spring 118. The lever arm 88 is pivotably mounted about a flexible hinge or reed 122, similar to the hinge 96 of the lever 86 and supported on the opposite end of the block 97.

A minimum material gaging probe 124 is carried by the arm 88 at a distance from the hinge 122 equal to the distance from pin 114 to hinge 122. Thus the probe 124 is carried by the arm 88 an amount equal to the maximum metal deviation. In the illustrated embodiment the minimum material gaging member is in the form of a probe 124 which is sensitive to deviations in the pitch diameter of the product 104. The probe 124 is slidably mounted on the arm 88 for movement toward and away from the gage roll 94.

The extent of movement of the pin 124 relative to the arm 88 is reflected by a reading on a minimum material limit gage 126. A dial actuating arm 127 is pivotably held by a spring hinge 128 and includes a probe engaging member 130 which continually urges the probe 124 into contact with the thread of the product 104. The outer end of the lever 127 engages the stem 132 of the dial 126. The distance from the stem 132 to the hinge 128 is equal to twice the distance from the contact 130 to the hinge 128. Thus probe movement, which as explained above is sensitive to one-half pitch diameter variations, results in movement of the dial stem 130 an amount equal to pitch diameter deviations.

Means is provided for adjusting the position of the probe 124 axially of the product 104. As best seen in FIG. 7, the lever arm 88 is composed to two separable parts 134 and 136. The part 136 which holds the probe 124 is pivotable about a pin 138. A screw 140 extends from the fixed part 134 outwardly through a vertically elongated slot 142. By loosening the screw 140, the outer portion of the arm may be adjusted so as to insure proper contact of the probe 124 with the thread of the product.

After positioning the probe 124 to the correct position, the screw 140 is tightened.

In operation of the mechanical computer gage, the dials 108 and 126 are zeroed with a setting plug. Thereafter the lever arm 86 is swung outwardly about the hinge 96 compressing spring 98. Spring 118 transmits this movement of the arm 86 to the arm 88 until the arm 88 comes into engagement with the stop screw 120 after which the spring 118 will be compressed. Sufficient opening is thus provided for the product to be inserted between the gage rolls. The arm 86 is then moved to bring the gage roll 94 into engagement with the product 104. Any deviation of the product from standard size will result in a positioning of the roll 94 toward or away from the fixed rolls 90 and 92 which will be transmitted to the arm 88. Pin 114 will cause the stem of the dial 108 to move an amount equal to the total deviation of the product. Furthermore, since the arm 88 is pivoted half way between the pin 114 and the probe 124, the probe 124 will be carried toward the fixed roll 94 a distance equal to the total deviation. Moreover, the probe 124 which is sensitive to pitch diameter will be moved relative to the arm 88 a distance equal to one-half pitch diameter deviation. This will be doubled by the lever 127 and the dial 126 will read pitch diameter error, if any such error is present in the threads of the product being gaged. Thus in a single gaging operation both maximum and minimum material gaging is accomplished accurately and simultaneously.

Having thus disclosed this invention what is claimed is:

1. Screw thread indicator gage comprising a pair of stationary gaging rolls and another gaging roll movable toward and away from the stationary rolls, an indicator responsive to movement of said movable roll from a basic setting, a probe disposed in a plane perpendicular to a line extending from center to center of said stationary rolls, said probe being movable in response to the algebraic sum of the extent of movement of said first movable roll and deviation of a thread element from a basic setting, computing means responsive to movement of said movable roll and said probe for computing the deviation of said thread element, and means for indicating the output of said computer.

2. Screw thread indicator gage comprising a pair of stationary gage rolls, a third gage roll mounted for movement toward and away from said stationary rolls, said rolls being maximum material gaging type mounted with their axes in parallel relation radially equally spaced about a given axis, an indicator responsive to movement of said movable roll, a probe movable for sensing the pitch diameter of a screw thread, said probe being disposed in a plane containing the perpendicular bisector of a plane containing the axes of the stationary rolls, means for computing the algebric sum of the extent of movement of said movable roll and said probe, and an indicator responsive to the output of said computer for indicating pitch diameter of said screw thread.

3. Indicator gage for simultaneously gaging effective diameter and pitch diameter of a screw thread, said gage comprising a first member movable in response to deviation in the effective diameter of said screw thread, a second movable member disposed on the same diameter as said first movable member for sensing the pitch diameter of said screw thread, and a computer for comparing the amount of movement of said first and second movable members.

4. Indicator gage for simultaneously gaging effective diameter and pitch diameter of a screw thread, said gage comprising a maximum material limit gaging member for measuring the effective diameter of said thread, said maximum material gaging member being disposed at a predetermined position from the axis of said screw thread, a probe movably mounted for sensing the pitch diameter of said screw thread and located in a plane containing said axis and said first maximum material gaging member, and a computer for comparing the amount of movement of said gaging member and said probe for segregating pitch diameter from outer screw thread elements included in effective diameter of a screw thread.

5. Indicator gage for simultaneously gaging effective diameter and pitch diameter of a screw thread, said gage comprising a pair of stationary gage rolls and a third gage roll mounted on a first lever arm swingable toward and away from the fixed gage rolls, said rolls being disposed with their axes in spaced parallel relation and being maximum material gaging type, a maximum material indicator responsive to movement of said first lever arm, a probe carried by a second lever arm for sensing and computing pitch diameter errors, said probe being disposed diametrically opposite said movable gage roll, means for moving said second lever arm in response to movement of the first lever arm, said probe being movable independently of said second lever arm, and an indicator responsive to the independent movement of said probe.

References Cited by the Examiner

UNITED STATES PATENTS

| | | | |
|---|---|---|---|
| 2,016,420 | 10/1935 | Engst | 33—174 |
| 2,306,469 | 12/1942 | Rupley | 33—168 |
| 2,457,727 | 12/1948 | Rifenbergh | 33—179.5 |
| 2,553,852 | 5/1951 | Eastman | 33—76 |
| 2,677,269 | 5/1954 | Aller | 33—174 |
| 2,770,050 | 11/1956 | Johnson | 33—199 |
| 2,842,862 | 7/1958 | Johnson | 33—199 |
| 2,848,816 | 8/1958 | O'Neill | 33—148 |

ISAAC LISANN, *Primary Examiner.*

LOUIS R. PRINCE, *Examiner.*